Nov. 21, 1967 M. D. PETROFF ET AL 3,354,314
IMAGE CONVERTER APPARATUS USING FINE WIRE
ELECTRON EMISSIVE SCREEN
Filed Feb. 4, 1965 2 Sheets-Sheet 1
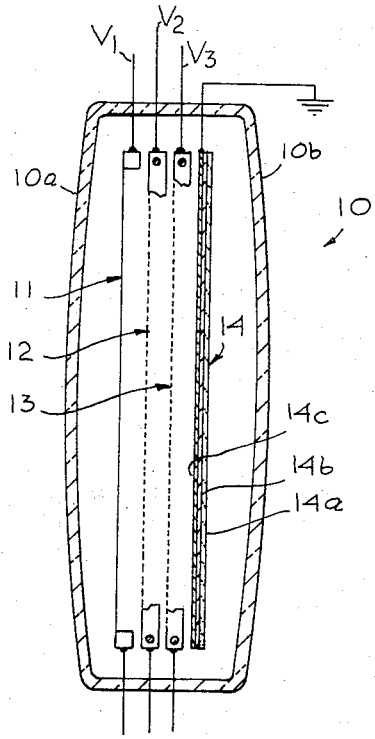
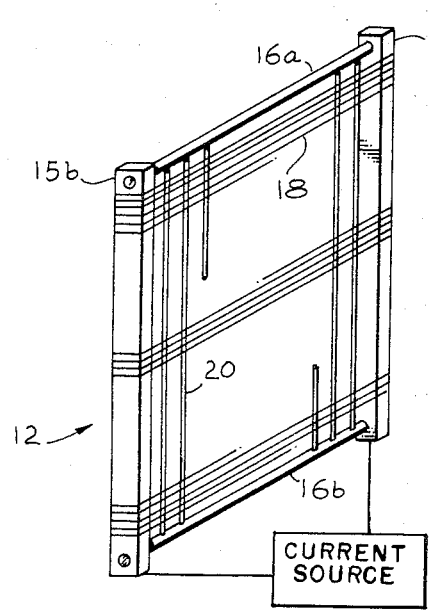
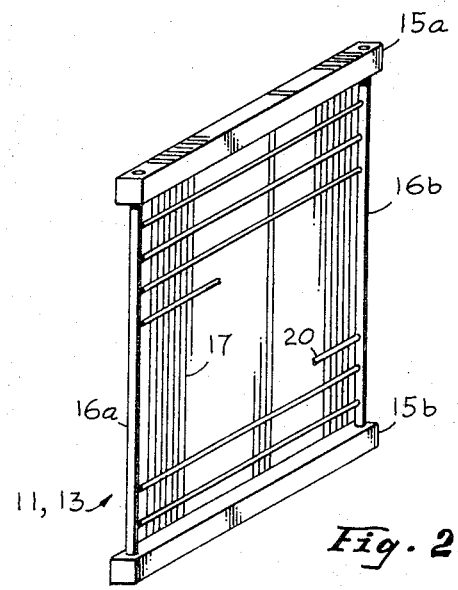
INVENTORS
MICHAEL D. PETROFF
STANLEY F. SWIADEK
BY Allen E. Botney
ATTORNEY Nov. 21, 1967  M. D. PETROFF ET AL  3,354,314
IMAGE CONVERTER APPARATUS USING FINE WIRE
ELECTRON EMISSIVE SCREEN
Filed Feb. 4, 1965  2 Sheets-Sheet 2

INVENTORS
MICHAEL D. PETROFF
STANLEY F. SWIADEK
BY Allen E. Botney
ATTORNEY

United States Patent Office 3,354,314
Patented Nov. 21, 1967

3,354,314
IMAGE CONVERTER APPARATUS USING FINE WIRE ELECTRON EMISSIVE SCREEN
Michael D. Petroff, Los Angeles, and Stanley F. Swiadek, Arcadia, Calif., assignors to National Engineering Science Company, Pasadena, Calif., a corporation of California
Filed Feb. 4, 1965, Ser. No. 430,389
6 Claims. (Cl. 250—213)

ABSTRACT OF THE DISCLOSURE

In the apparatus described herein a visible image of an object is formed by making use of the millimeter waves in the region of two millimeter wavelengths or shorter emitted by said body. Said waves, in the apparatus described, form a thermal image for a screen of fine wires coated with electron emissive materials and the electrons emitted form a visible image on a fluorescent screen.

---

The present invention relates in general to the radiation detector art and more particularly relates to a camera type of apparatus in which millimeter wave patterns are converted to visible images.

Equipment that will allow the viewing of objects through dense fog and smoke screens is, at present, nonexistent and a principal reason for this circumstance is that for effective penetration through fog or smoke, electromagnetic waves must have wavelengths appreciably longer than the droplet or particle diameters. Accordingly, this rules out all of the spectrum of electromagnetic radiation with wavelengths shorter than about 100 microns, i.e., infra-red through ultra-violet. Furthermore, although microwave and lower frequency radiations easily penetrate through fog and smoke, the relatively long wavelengths of these radiations (above 1 centimeter) do not permit their utilization in a camera type of device of reasonable size. More specifically, the linear resolution of the image on the focal plane of a camera can at best be about equal to the wavelength being used. This means that even for 1 centimeter waves, an image of, for example, 200 x 200 resolution elements, the camera would have to be a box at least 6 feet on each side, which is obviously impractical.

Millimeter waves in the region of two millimeter wavelengths or shorter will, for the type of resolution mentioned above, bring the camera size down to a more reasonable value, namely, a cube about 1 foot on the side. However, the opportunity of using millimeter waves for the purposes mentioned has heretofore been precluded by the fact that a practical and effective way had not, prior to this time, been found to convert the millimeter wave patterns to a satisfactory visible image. There has, therefore, been a long-felt need for an apparatus that would provide such a conversion, and the present invention fulfills this need.

Accordingly, it is an object of the present invention to provide a practical arrangement by means of which objects may be viewed through dense fog, smoke screens and other like obstructing media.

It is a further object of the present invention to provide apparatus for converting millimeter wave transmissions to a visible image.

It is an additional object of the present invention to provide apparatus for the detection of signals of different wavelengths within the millimeter wave region.

According to the basic concept of the present invention, image conversion is achieved by first converting the latent millimeter-wave image to a corresponding electron-beam image and thereafter by converting the electron-beam image to the desired visible image. For these purposes, a new type of converter tube is used and the essence of the tube and, therefore, of the invention, resides in new and novel grid structures that have been developed and in their arrangement. More specifically, a preferred embodiment of a millimeter-wave to visible-image converter tube would include an evacuated envelope having a pair of glass panels about 1 foot square in area facing each other about 2 inches apart. This envelope would house three screens, namely, a screen of very fine wire and two coarser wire grids on either side of it. The millimeter wave power is absorbed by the fine wire screen, which results in local heating of the wires in proportion to the intensity, and since the wires are very thin, conduction of the heat along the wires is negligible in comparison to radiation. Furthermore, because the heat capacity per unit area of the screen is extremely small, microwatts of absorbed power per resolution area will result in a temperature rise of about 10° centigrade. The wires in this fine screen are coated with a monolayer of a material that forms a thermionic cathode surface having a low work function, such as, for example, cesium, which has a work function of only 1.5 electron volts. It can readily be shown that if such wires are maintained at a suitable temperature, such as by passing a small current through them, electron emission will change by a factor of 10 for every 30 degree temperature increase. Thus, if temperature variations of 10° centigrade form the image, the corresponding thermionic emission density variations would be on the order of 100%. Consequently, the average emission is on the order of several milli-microamperes of electron current per resolution area, and when accelerated and made to impinge on a fluorescent screen, will give an amount of visible light well within the sensitivity of the eye.

Embodiments of the present invention have many possible applications. Speaking generally, it opens up for use a new portion of the wave spectrum that has not heretofore been exploited but, rather, has merely been a subject of scientific investigation. More specifically and as was previously mentioned, the present invention makes it possible in a practical way to utilize millimeter waves through fog or smoke screens. Consequently, one possible application or embodiment of the present invention is in the viewing of millimeter wave runway beacons from airplanes landing in dense fog. Another possible application is in photographing through fog or smoke where an area is illuminated by a millimeter wave source and a small part of the reflected power is received by image converter apparatus constructed in accordance with the principles of the present invention.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a side view in cross-section of an image-converter tube according to the present invention;

FIGURE 2 is a perspective view of one type of screen used in the image-converter tube of FIG. 1, two of these screens being used therein;

FIGURE 3 is a perspective view of another of the screens mounted in the image-converter tube;

Figure 4:
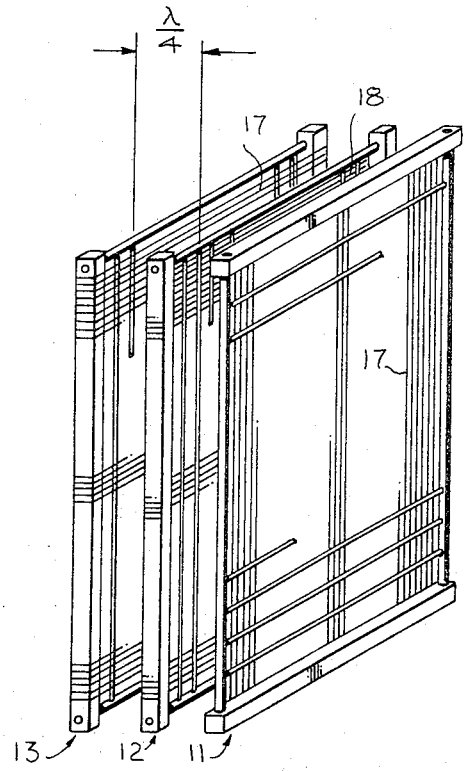
Figure 5:
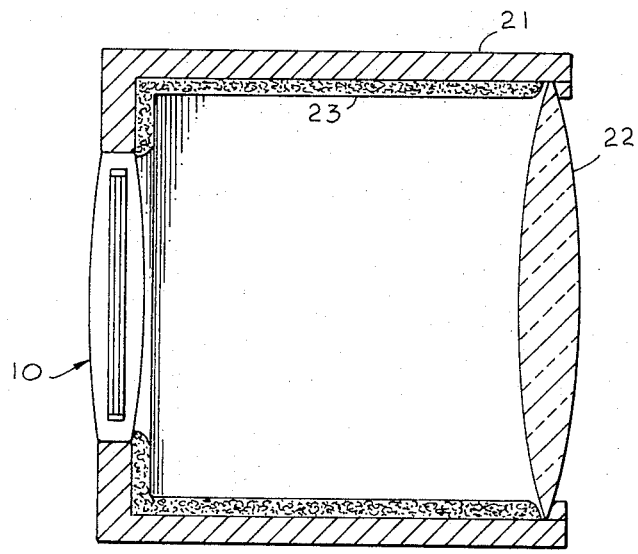

FIGURE 4 is a perspective view of the three screens used in the converter tube of FIG. 1, namely, the two screens of the FIG. 2 type and the screen of the FIG. 3 type, and illustrates in greater detail than in FIG. 1 the manner in which they are mounted relative to each other; and FIGURE 5 is a side view, in cross-section, of a millimeter-wave camera apparatus encompassed by the present invention and illustrates the manner in which the FIG. 1 tube would be mounted in such an apparatus for the purpose of converting millimeter-wave signals to a visible image.

For a consideration of the invention in detail, reference is now made to the drawings wherein like or similar parts or elements of the embodiment illustrated therein are given like or similar designations throughout the several figures. Referring initially to FIG. 1, the image-converter tube therein is shown to include an evacuated glass envelope 10 in which are mounted three wire screens 11, 12 and 13 in close proximity to each other and in face-to-face relationship, one screen, namely, screen 12, being positioned between the other two. As may be seen from the figure, the screens are positioned parallel to each other and also parallel to the front and rear faceplates of the tube envelope which are respectively deisgnated 10a and 10b. Also mounted within the envelope and between screen 13 and rear faceplate 10b is a luminous or fluorescent screen, generally designated 14, whose component parts are a thin glass supporting plate 14a on whose inside surface, that is to say, on its surface facing the wire screens, are deposited two thin layers designated 14b and 14c, layer 14b being made of a phosphor material that emits light when struck by electrons and layer 14c being a very thin metal film, such as aluminum, that covers the surface of the phosphor layer. The best results for image definition are obtained with grainless evaporated phosphors or wtih single large crystals of phosphors because of their grainless structure. Metal film 14c is thin enough so that electrons can easily penetrate it and is made of metal so as to provide an equipotential surface over the phosphor layer. Aluminum is preferred as a film material in order to reflect light toward and through glass plate 14a.

Finally, as is indicated in the figure, different voltage potential $V_1$, $V_2$ and $V_3$ are respectively applied through the envelope to wire screens 11, 12 and 13, the respective potentials having magnitudes such that screen 12 is maintained slightly positive with respect to screen 11 and, likewise, screen 13 is maintained slightly positive with respect to screen 12. By way of example, voltages $V_1$, $V_2$ and $V_3$ may typically be $-1005$ volts, $-1000$ volts and $-995$ volts, but these values are only representative so that other voltages may be used just as well. On the other hand, metal film 14c is preferably maintained at a potential that is considerably more positive than those for the wire screens and for this reason is grounded, thereby constituting it an accelerating electrode for the electrons that may be emitted from these screens.

One final point should be made with respect to the image-converter tube of FIG. 1 and that is that rear faceplate 10b may be used, if desired, as the support structure for the fluorescent screen material. More specifically, if it is so desired, the use of glass plate 14a may be eliminated simply by depositing the phosphor material onto the inside surface of rear faceplate 10b and the metal film deposited over the phosphor material as before.

In order to provide a clearer understanding of wire screens 11–13, reference is now made to FIG. 2 wherein the construction of a screen that may be used for both screens 11 and 13 is shown in greater detail. Thus, screen structures 11 and 13 are identical in their construction so that each includes a rectangular-shaped frame that comprises a pair of parallel bars 15a and 15b spaced from each other by means of a pair of supporting rods 16a and 16b mounted therebetween at the ends of the bars. Bars 15a and 15b are preferably made of a good conducting material, such as copper, whereas rods 16a and 16b are preferably made of an insulating material, such as quartz.

By way of example of the kind of dimensions that may be involved in the manufacture of these bars and rods, bars 15a and 15b may each be 1 foot long and 0.200 inch on a side while rods 16a and 16b may each be only about 0.100 inch in diameter and also about 1 foot long.

Mounted between rods 16a and 16b, preferably in a plane, and extending between bars 15a and 15b are a plurality of wires, such as wire 17, that are spaced apart from each other by a distance substantially equal to one-quarter the wavelength of the millimeter wave at the center of the bandwidth for which the converter tube is designed. Thus, by way of example, if a 3-millimeter wave is at the center of the bandwidth, then the spacing between adjacent wires 17 would be 0.030 inch. Although other materials may also be used, wires 17 are preferably made of tungsten and each wire is preferably about 0.00020 inch in diameter. Furthermore, the ends of these wires are respectively in contact with bars 15a and 15b and they are bonded to the bars by having gold plating deposited over them. Gold is used because of its excellent conductive properties, but it will be recognized by those skilled in the art that other materials having comparable properties may also be used as the bonding agent. Any one of a number of well known techniques may be employed to deposit the abovesaid gold plating as, for example, by spraying it on or by the technique of vacuum deposition. Finally, to provide further support for wires 17, should it prove to be necessary, additional very thin quartz rods, in the order of 0.005 inch in diameter, may be mounted between rods 16a and 16b as shown in the figure.

For a consideration now of the structural details of wire screen 12, reference is made to FIG. 3 wherein screen 12 is illustrated and from which it can be seen that the frame, comprising bars 15a and 15b and rods 16a and 16b, is the same as it was before except that in FIG. 3 it has been rotated through a 90° angle relative to that in FIG. 2. Hence, bars 15a and 15b in FIG. 3 are made of the same material and have the same dimensions as their counterparts in FIG. 2, the same being true for rods 16a and 16b. Thus, for the example previously given, the length of the bars and the rods would respectively be 1 foot, the bars would be 0.200 inch on the side, and the rods would be 0.100 inch in diameter.

The major difference between screen 12 on the one hand and screens 11 and 13 on the other hand is in the wires making up the screens. More particularly, the wires in screen 12, designated 18, are much thinner than the wires in the FIG. 2 screen and in this sense, therefore, are finer than the latter wires. For comparison purposes, if wires 17 are made to have a 0.00020 inch diameter, then wires 18 would have a 0.00002 inch diameter, that is to say, wires 18 would be about one-tenth as thick. Rather than tungsten, wires 18 are preferably made of platinum and are coated with a monolayer of a material that forms a thermionic cathode surface having a low work function, cesium being an example of such a material. As before, wires 18 are parallel to each other and to rods 16a and 16b, and are spaced from each other by a distance substantially equal to one-quarter wavelength of the millimeter wave at the center of the bandwidth for which the tube is designed. Thus, using the figures previously used by way of illustration, if a 3 mm. wave is involved, then the spacing between adjacent wires 18 would be 0.030 inch. One final point must be made, namely, that wires 18 are maintained at a fairly high temperature, such as 200° C., and this can readily be done by passing a small current through them. This, in turn, can be done by maintaining a suitable potential difference between bars 15a and 15b. Quartz rods 20, suitably spaced, may be used to provide additional backing support for the wires. Rods 20 need only be about 0.005 inch in diameter.

Having thus described screens 11, 12 and 13 individually, reference is now made to FIG. 4 wherein the three screens are shown together as they would be mounted inside tube 10. Thus, as was previously mentioned and as is clearly shown in FIG. 4, screens 11–13 are positioned parallel to one another with screen 12 positioned substantially midway between screens 11 and 13. The spacing between screens 11 and 13 is preferably equal to one-half the wavelength of the millimeter wave at the center of the bandwidth for which the tube was designed, with the result that screen 12 is spaced one-quarter wavelength away from screens 11 and 13. Hence, employing the values of figures previously presented by way of example, for a 3 mm. wave the spacing between screens 11 and 13 would be 0.060 inch, whereas the spacing between screen 12 and either of screens 11 and 13 would, therefore, be 0.030 inch.

At this point it would be well to mention that screen 12 is the power-absorbing screen, while screens 11 and 13 are, respectively, shielding and reflecting screens. With respect to the significance of reflecting screen 13, almost all the incident power is absorbed if the wire mesh of screen 12 is placed in front of a perfect reflector at a distance of $\lambda/4$. Without such a reflector, half the power would be absorbed, ¼ reflected and ¼ transmitted through the screen. Accordingly, with the aid of reflecting screen 13, substantially all the incident power is absorbed by screen 12, thereby producing a highly efficient operation. As for shielding screen 11, this screen is intended to protect screen 12 from stray fields which might otherwise adversely affect the functioning of screen 12 and which might ultimately lead to its damage. It is for this reason that screen 11 is, as may be noticed from the figure, positioned so that its wires 17 are cross-wise to the wires of screens 12 and 13, namely, so that it will be transparent to waves within the operating bandwidth of the tube but not to stray fields, especially so with respect to D.C. fields, thereby providing the desired protection.

The manner in which an image converter tube of the kind previously discussed would be employed in a millimeter-wave image-converter apparatus is illustrated in FIG. 5. As shown therein, the image-converter apparatus comprises a box-shaped housing structure 20 in one wall of which, at the far or rear end, is an opening in which tube 10 is mounted. The tube is mounted so that fluorescent screen 14, upon which the image will appear, can be viewed from the rear of the apparatus. The forward or front end of housing structure 20 is preferably open and a lens 21 is mounted in and covers this opening for the purpose of focusing the millimeter-wave image onto the focal plane of the image-converter apparatus which, it will be recognized by those skilled in the art, is absorbing screen 12. The lens of such a camera can be made from polyethylene or Teflon and, in addition, can be made deliberately opaque or black to visible and infrared light while remaining transparent to millimeter waves. Finally, the inner surface of housing 20 is lined with a substance 22 that is lossy for millimeter waves, the purpose of this material being to reduce possible reflections from the sides of the structure to an absolute minimum. To provide some understanding of the relative size of the FIG. 5 image-converter apparatus, for 3 millimeter waves the apparatus would be about 1 foot on a side.

In operation, a millimeter-wave image of an object is projected by lens 21 onto radiation-absorbing screen 12. The radiation incident upon this member causes wires 18 thereof to increase in temperature according to the amount of power absorbed at different points along these wires or, stated differently, the millimeter wave power is absorbed by the fine wire screen to produce local heating of the wires in proportion to the intensity of the incident radiation. As was previously mentioned, the wires are coated with a monolayer of a material, such as cesium, that forms a thermionic cathode surface with a low work function. Consequently, in response to the millimeter-wave image, a beam of electrons is emitted from screen 12 whose pattern, at any instant, corresponds to the incident wave image at that point in time. This electron beam is drawn through screen 13 under the influence of the potential on fluorescent screen 14 and is thereafter very greatly accelerated toward the fluorescent screen and ultimately strikes it. When this occurs, a visible image appears on the fluorescent screen that corresponds to the millimeter-wave image received very shortly before. It should be mentioned at this time that since screen 12 is maintained at a somewhat more positive potential than screen 11, any electrons emitted from screen 12 toward screen 11 will, because of the nature of the potential gradient existing between these two screens, be quickly reversed in direction and thereafter accelerated toward the fluorescent screen with the rest of the beam.

It should also be mentioned that converter tube 10 and, therefore, the entire camera apparatus, can be designed to operate over any desired bandwidth within the millimeter-wave region and that this can be done by appropriately spacing the screen wires at the time of their fabrication. Moreover, it may be desirable under some circumstances to extend the bandwidth or to simultaneously operate over different bandwidths, and this can be done by fabricating the screen with variable spacings between their wires.

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. Apparatus for converting a millimeter-wave image to a corresponding visible image, said apparatus comprising: an evacuated envelope having front and rear faceplates that are transparent to millimeter-wave energy; a fluorescent screen and a millimeter-wave radiation-absorbing screen mounted within said envelope in face-to-face relationship with each other and with said envelope faceplates, said fluorescent screen being positioned between said radiation-absorbing screen and said rear faceplate and maintained at a potential that is positive relative to said absorbing screen, said radiation-absorbing screen including a plurality of thin and parallel wires spaced from each other by a distance equal to about one-quarter the wavelength of the millimeter wave at the center of the operating bandwidth of the apparatus, said wires being individually covered with a fine layer of material that emits electrons in response to the application of heat thereto; and electrical means for sending a direct-current through said wires.

2. Apparatus for converting a millimeter-wave image to a corresponding visible image, said apparatus comprising: an evacuated envelope having front and rear faceplates that are transparent to millimeter-wave energy; a fluorescent screen mounted within said envelope and facing the rear faceplate thereof; and absorbing and reflecting screens mounted in said envelope between the front faceplate thereof and said fluorescent screen and in face-to-face relationship therewith, said screens being parallel to each other and spaced apart from one another about one-quarter wavelength of the millimeter wave at the center of the millimeter bandwidth of operation of the apparatus, said absorbing screen including means for absorbing millimeter-wave energy incident thereon and additional means for releasing electrons in proportion to the amount of incident millimeter-wave energy, said reflecting screen being positioned between said absorbing and fluorescent screens and operable to reflect millimeter-wave energy incident thereon to said absorbing screen; and voltage means for maintaining said fluorescent screen at a considerably higher potential and said reflecting screen at a slightly higher potential than that on said absorbing screen.

3. The apparatus defined in claim 2 wherein the means in said absorbing screen is a plurality of thin wires lying in a plane and spaced from each other by a distance about equal to one-quarter the wavelength of the millimeter wave at the center of said bandwidth of operation, and wherein said additional means is a fine layer of material having a low work function covering each of said wires for emitting electrons therefrom in response to the absorption of millimeter-wave energy by said wires.

4. A millimeter-wave image converter apparatus comprising: a box-shaped housing structure open at the front and rear ends thereof; a tube for converting a millimeter-wave image to a visible image mounted in the rear opening of said housing structure; and a lens that is transparent to millimeter-wave energy mounted in the front opening of said housing structure, said lens being operable to focus millimeter-wave energy incident thereon on said converter tube, said tube including a fluorescent screen and a screen for absorbing millimeter-wave energy incident thereon, said latter screen including means for converting millimeter-wave energy absorbed at every point thereon to heat in proportion to the amount of energy absorbed thereat and additional means covering said means for releasing electrons at each point therefrom according to the heat generated at the corresponding point on said means; and electrical means for accelerating the electrons toward said fluorescent screen.

5. Apparatus for converting a millimeter-wave image to a visible image, said apparatus comprising: an evacuated tube envelope having a front wall that is transparent to millimeter-wave energy and a rear wall that is transparent to visible light; a fluorescent screen mounted in said envelope in the proximity of said rear wall and in face-to-face relationship therewith; and absorbing, reflecting, and shielding screens mounted in said envelope between said fluorescent screen and said front wall and in face-to-face relationship therewith, said reflecting and shielding screens being spaced apart a distance about equal to one-half the wavelength of the millimeter wave at the center of the bandwidth of operation of the apparatus and said absorbing screen being positioned about midway therebetween, said shielding screen including filter means for passing substantially only millimeter-wave energy incident thereon, said absorbing screen including means for converting millimeter-wave images incident thereon to corresponding thermal images and additional means for generating electron images corresponding to said thermal images and in response thereto, and said reflecting screen including elements for reflecting initially unabsorbed millimeter-wave energy back to said absorbing screen; and means connected to said screens for accelerating said electron images to said fluorescent screen, whereby corresponding visible images are produced thereon.

6. The apparatus defined in claim 5 wherein said filter means, said means and said elements are respectively first, second and third sets of wires positioned in parallel planes with the wires in each set being spaced from each other a distance equal to about one-quarter wavelength of the millimeter wave at the center of said bandwidth of operation, the wires in said second set being much finer than those in said first and third sets, the wires in said second and third sets extending in one direction and the wires in said first set extending in another direction that is crosswise to those in said second and third sets; and wherein said additional means is a monolayer of material on each wire in said second set that emits electrons in response to the application of heat thereto, the number of electrons emitted from any point being proportional to the amount of heat applied thereto.

References Cited

UNITED STATES PATENTS

| 2,196,691 | 4/1940 | Batchelor | 250—213 X |
| 2,307,209 | 1/1943 | George | 313—66 X |
| 2,421,182 | 5/1947 | Bayne | 250—213 |
| 2,572,494 | 10/1951 | Krieger et al. | 313—66 X |
| 2,975,283 | 3/1961 | Morton | 250—83.3 |

WALTER STOLWEIN, *Primary Examiner.*